(12) United States Patent (10) Patent No.: US 8,683,311 B2
Penov et al. (45) Date of Patent: Mar. 25, 2014

(54) GENERATING STRUCTURED DATA OBJECTS FROM UNSTRUCTURED WEB PAGES

(75) Inventors: Francislav P. Penov, Kirkland, WA (US); Patrick Jakubowski, Seattle, WA (US); Wissam Kazan, Redmond, WA (US); Amandeep S. Ghag, Maple Valley, WA (US); György K. Schadt, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 572 days.

(21) Appl. No.: 12/635,823

(22) Filed: Dec. 11, 2009

(65) Prior Publication Data

US 2011/0145698 A1 Jun. 16, 2011

(51) Int. Cl.
*G06F 17/00* (2006.01)

(52) U.S. Cl.
USPC ........... 715/208; 715/204; 715/206; 715/234; 715/236

(58) Field of Classification Search
USPC .......................... 715/204, 234, 243, 273, 788
See application file for complete search history.

(56) References Cited

U.S. PATENT DOCUMENTS

| | | | |
|---|---|---|---|
| 6,912,555 B2 * | 6/2005 | Lemon et al. ................. | 715/239 |
| 6,920,609 B1 | 7/2005 | Manber et al. | |
| 7,454,711 B2 | 11/2008 | Angiulo et al. | |
| 7,707,265 B2 * | 4/2010 | Gibson ......................... | 709/217 |
| 8,442,940 B1 * | 5/2013 | Faletti et al. .................. | 707/610 |
| 2002/0073058 A1 * | 6/2002 | Kremer et al. ..................... | 707/1 |
| 2002/0122053 A1 * | 9/2002 | Dutta et al. .................... | 345/729 |
| 2003/0172126 A1 * | 9/2003 | Brown et al. .................. | 709/217 |
| 2003/0229854 A1 * | 12/2003 | Lemay .......................... | 715/513 |
| 2005/0022115 A1 * | 1/2005 | Baumgartner et al. ........ | 715/513 |
| 2005/0257400 A1 * | 11/2005 | Sommerer et al. ................ | 36/13 |
| 2005/0283537 A1 * | 12/2005 | Li et al. ......................... | 709/240 |
| 2006/0047693 A1 * | 3/2006 | Kojima et al. ................ | 707/102 |
| 2006/0080405 A1 * | 4/2006 | Gibson ......................... | 709/218 |
| 2006/0287989 A1 | 12/2006 | Glance | |
| 2007/0011134 A1 | 1/2007 | Langseth et al. | |
| 2007/0106956 A1 * | 5/2007 | Platt et al. ..................... | 715/808 |
| 2007/0288247 A1 * | 12/2007 | Mackay ......................... | 705/1 |
| 2008/0034058 A1 * | 2/2008 | Korman et al. ............... | 709/217 |
| 2008/0147672 A1 | 6/2008 | Pena et al. | |

(Continued)

OTHER PUBLICATIONS

Josh Lowensohn, 'Newbie's Guide to Facebook', Aug. 1, 2007, CNET, 'news.cnet.com/newbies-guide-to-facebook'.*

(Continued)

*Primary Examiner* — Stephen Hong
*Assistant Examiner* — Matthew Ludwig
(74) *Attorney, Agent, or Firm* — Bryan Webster; Andrew Sanders; Micky Minhas

(57) ABSTRACT

A method described herein includes receiving data that identifies a web page, wherein the data that identifies the web page is desirably displayed to a first individual and resolving the web page to generate a markup language document, wherein the markup language document comprises unstructured data. The method also includes extracting portions of the markup language document and generating a structured data object, wherein the structured data object includes the portions of the markup language document. The method further includes causing a summary of the web page to be displayed to the first individual, wherein the summary of the web page is based at least in part upon the structured data object.

20 Claims, 10 Drawing Sheets

(56) References Cited

U.S. PATENT DOCUMENTS

| | | | |
|---|---|---|---|
| 2008/0313177 A1* | 12/2008 | Li et al. | 707/5 |
| 2009/0012940 A1* | 1/2009 | Ives et al. | 707/3 |
| 2009/0177754 A1* | 7/2009 | Brezina et al. | 709/206 |
| 2009/0313100 A1* | 12/2009 | Ingleshwar | 705/14.25 |
| 2011/0022528 A1* | 1/2011 | Hennessy | 705/319 |
| 2011/0185273 A1* | 7/2011 | DaCosta et al. | 715/234 |

OTHER PUBLICATIONS

"Web Page Thumbnails 2.1.0—Detailed Description Page", Retrieved at <<http://www.hotlib.com/24409/details-webpage-thumbnails.html>> Sep. 20, 2009, pp. 1-2.

* cited by examiner

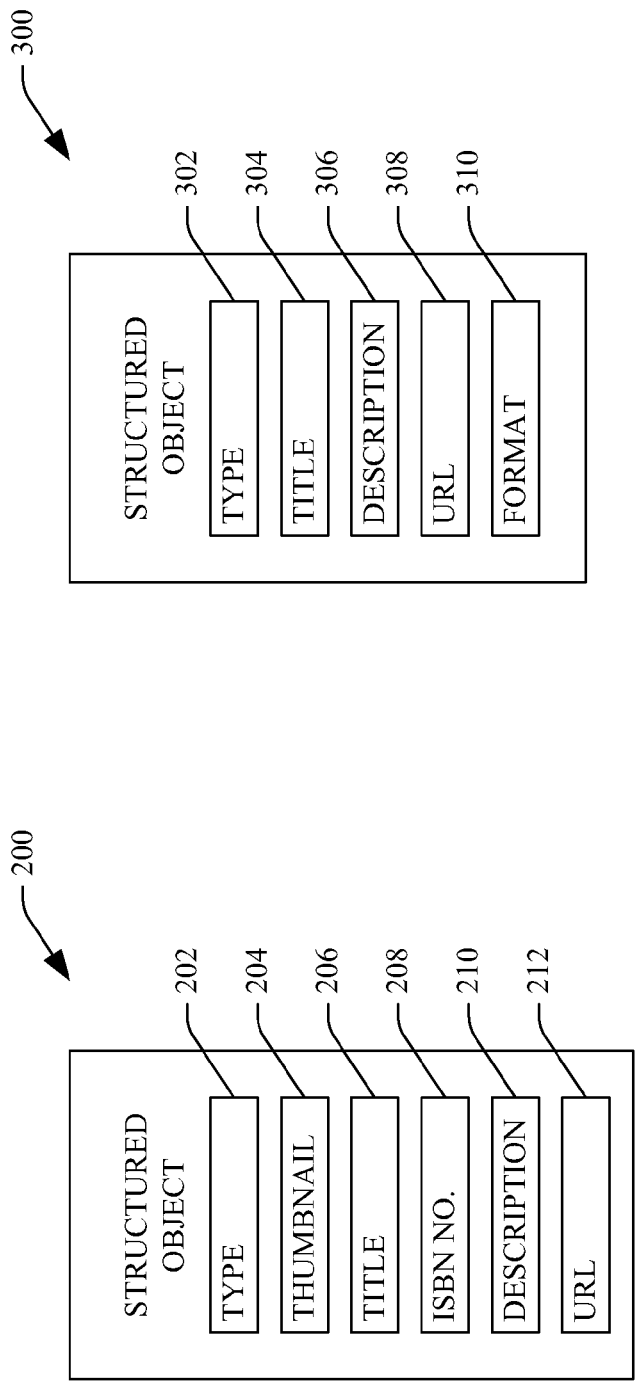

GENERATING STRUCTURED DATA OBJECTS FROM UNSTRUCTURED WEB PAGES

BACKGROUND

Many existing applications allow people to share data with one another. For example, email applications allow an individual to generate text and transmit such text to an intended recipient. Additionally, email applications allow attachment of data files including word processing documents, videos, etc, wherein such data files can be transmitted from a sender to the recipient. Similarly, instant messaging applications allow individuals have a substantially instantaneous electronic conversation with one another. These instant messaging applications have been configured to allow transmittal of data files from a computer of a sender to a computer of a recipient by way of a conversation window. In yet another example, online social networking applications allow individuals to post comments, update status, share pictures with friends, etc. Thus, numerous computer executable applications exist that facilitate transfer and sharing of data between individuals.

In some instances, a first individual may wish to share a web page with a second individual. Conventionally, this is accomplished by placing a Uniform Resource Locator (URL) into a data entry field of a data sharing application (an email application, an instant messaging application, a social networking application, etc). The URL is provided to an individual in the form, for instance, of a hyperlink. To review the web page corresponding to the hyperlink, the recipient of such hyperlink can click the hyperlink with a mouse pointer, which causes an Internet browser to load the web page corresponding to the URL. The recipient of the hyperlink may be inconvenienced if the browser is caused to load the web page. For example, the recipient must stop what he or she is doing (e.g., stop reading the text of a message) to select the hyperlink. This may interrupt the train of thought of the individual. Further, causing a browser to load the web page may be expensive to a low-powered device, such as a mobile phone. Additionally, the recipient of the hyperlink may be unaware of the contents of web page corresponding to the hyperlink by simply reviewing text of the hyperlink. For example, the web page corresponding to the hyperlink may be or include content that is not interesting to the recipient (or is deemed profane by the recipient), but such recipient may only become aware of the content of the web page by causing the browser to load such web page.

SUMMARY

The following is a brief summary of subject matter that is described in greater detail herein. This summary is not intended to be limiting as to the scope of the claims.

Various technologies pertaining to generating a structured data object from content of a web page are described in detail herein. Such structured data object may be used, for instance, by an application to cause a rich preview of a web page to be generated, wherein the rich preview may include a thumbnail image, a title, a description, etc. In an example, data that is indicative of an identity of a web page can be received. For example, the data may be a Uniform Resource Identifier (URI) such as a Uniform Resource Locator (URL). For instance, a URI can be received from an application executing on a computer, such as an email application, an instant messaging application, an online social networking application, etc. Once the URI is received, the web page corresponding to the URI can be resolved into a markup language document (a resolved web page), wherein the markup language may be HTML.

Typically, web pages are generated via a markup language in an unstructured manner, such that two web pages that display substantially similar content may be generated in the markup language in entirely different manners. Once a web page has been resolved into a markup language document, a plurality of extractor definitions can be retrieved. The extractor definitions, for instance, can define which portions of the web page are desirably extracted to include in a structured data object and can further define a method of extracting such portions of the web page. One or more extractor definitions can be selected for utilization when extracting data from the resolved web page based upon any suitable technique. For instance, one or more extractor definitions may correspond to a particular web domain. Thus, one or more extractor definitions that correspond to the domain of the web page can be automatically selected. Additionally, extractor definitions may have priorities corresponding thereto, such that a higher priority extractor definition is utilized prior to a lower priority extractor definition. Further, extractor definitions may have priorities therein for certain elements to be extracted from the web page. For instance, an extractor definition may be configured to first check a first location in the resolved web page for a title, and then a second location in the resolved web page for a title, wherein the extractor definition has a higher priority for the first location when compared to the priority assigned to the second location.

The extracted data may be placed in a structured data object, and may be provided to an application for utilization by such application. For instance, an email application, an instant messaging application, an online social networking application, or the like may utilize such structured data object to render a rich preview of the web page. For example, the extractor definition utilized to extract certain data for the structured object may extract a thumbnail image corresponding to the web page, a title of the web page, and a description of the web page. The application may then render a preview of the web page that includes such thumbnail, title, and description. This rich preview may be placed in-line with other content. Thus, rather than a recipient being provided with a hyperlinked URL that corresponds to a web page, the recipient can be provided with a rich preview of the web page. Such preview may itself include a hyperlink, such that if the recipient deems the web page to be interesting, such recipient can select the rich preview and cause an Internet browser to load the web page.

Other aspects will be appreciated upon reading and understanding the attached figures and description.

BRIEF DESCRIPTION OF THE DRAWINGS

FIGS. 2 and 3 are example structured data objects.

DETAILED DESCRIPTION

Figure 1:
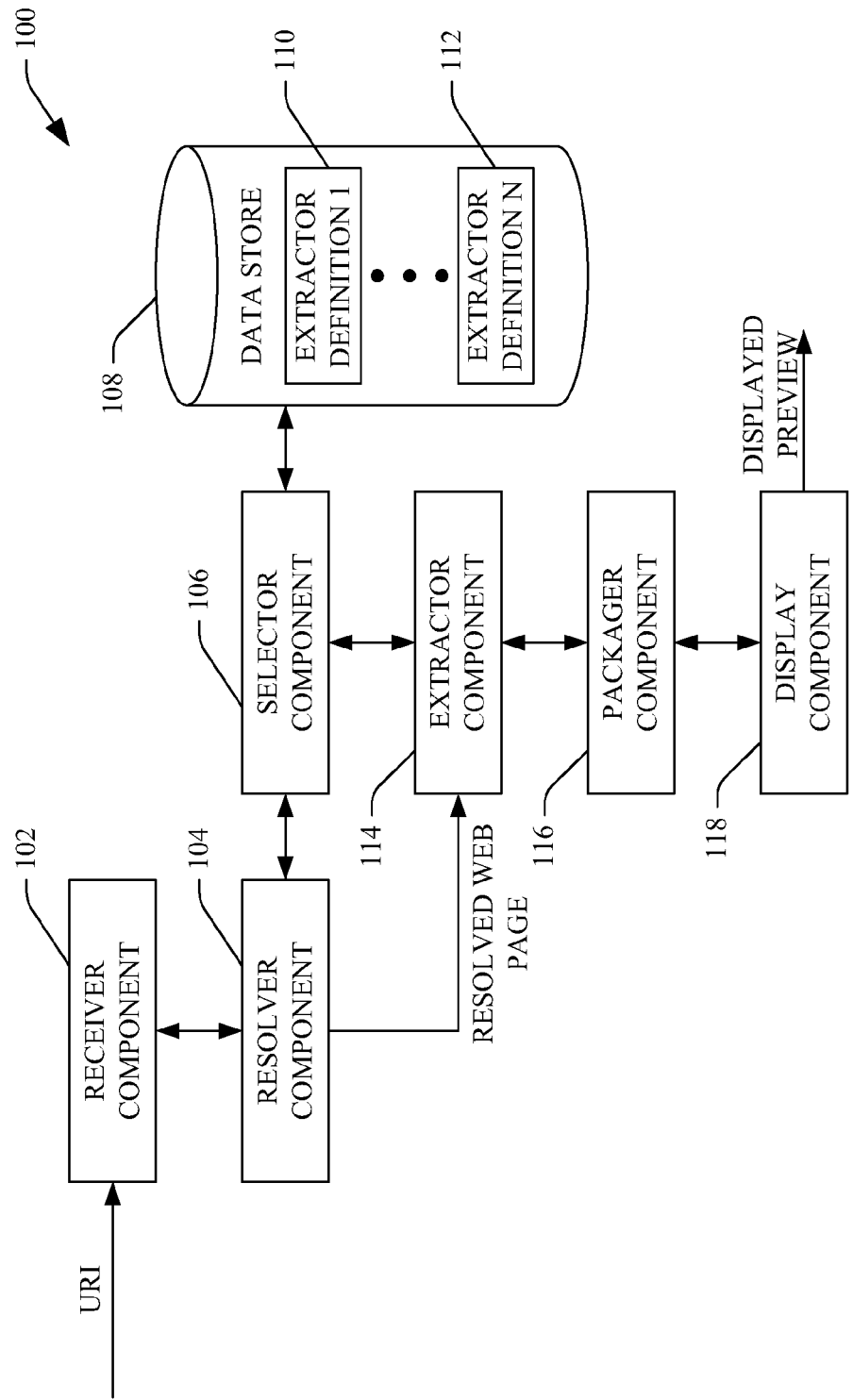
FIG. 1 is a functional block diagram of an example system that facilitates generating a structured data object from a web page.

Various technologies pertaining to generating a structured data object from a web page will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates generating a structured data object from content of a web page is illustrated. As described above, web pages in general generated in an unstructured manner; thus web pages are difficult to process by way of a computing algorithm. The system 100 is configured to generate a structured data object that, for instance, can be used to summarize content of a web page.

The system 100 includes a receiver component 102 that can receive data that is indicative of identity of a web page, such as Uniform Resource Identifier (URI), which may be a Uniform Resource Locator (URL). For example, the URI may be received from a computing application executing on a computing device such as an email application, an instant messaging application, a social networking application, etc. For example, when a sender of a URI places the URI in a text field of an email application, the receiver component 102 can receive such URI. In another example, when a sender of the URIs transmits the URI to a recipient via an instant messaging window, the receiver component 102 can receive such URI. It is to be understood, however, that the receiver component may receive the URI from any suitable source. In another example, the receiver component 102 can receive data from other suitable sources. For instance, a browser add-on can be utilized to collect information that is intended to be consumed, for instance, in an email or on a social networking site.

A resolver component 104 can optionally be in communication with the receiver component 102 and can resolve the web page corresponding to the URI to generate a markup language document (also referred to as a resolved web page). For example, the resolver component can resolve the web page to an HTML document. It is to be understood, however, that markup language document can be of any suitable markup language, including XML. In another example, the URI may point to data that is not written in a markup language, such as an image file.

A selector component 106 can receive the resolved web page and responsive thereto may access a data store 108 that comprises a plurality of extractor definitions 110-112. An extractor definition may conform to an XML schema that is configured to be utilized in connection with authoring (generating) structured data objects from content of resolved web pages. Pursuant to an example, the extractor definitions can be embedded in any suitable XML document. Additionally or alternatively, the extractor definitions can be embedded through utilization of one or more web standards, such as RSS or ATOM feeds. A web standard can be selected for ease of publishing, maintenance and consumption by applications. Additionally, the extractor definitions can include definitions of extraction mechanisms for each entity desirably extracted from the web page to include in a structured data object. As used herein, an entity may be a portion of a web page desirably extracted to create a structured data object, such as a title, a description, an image, or the like. While extractor definitions are to be described in greater detail below, it is to be understood that an extractor definition in general can be utilized to describe which entities to extract from the resolved web page (e.g., where to look for entities to extract in the resolved web page) and mechanisms for extracting such entities.

Moreover, the selector component 106 can select multiple extractor definitions for a single resolved web page. For example, some extractor definitions may be general in nature, such that they can be applied to any web page. Other extractor definitions may apply only to a particular type of web page (e.g., to a particular web domain or set of web domains). The extractor definitions may then be utilized to extract entities from the resolved web page based at least in part upon a priority assigned to such extractor definitions. Specifically, an extractor definition assigned a higher priority will be utilized prior to an extractor definition assigned a lower priority.

An extractor component 114 can be in communication with the resolver component 104 and the selector component 106 and can utilize one or more extractor definitions selected by the selector component 106 to extract data from the resolved web page generated by the resolver component 104. In an example, the extractor component 114 can extract data from data sources that are referenced in the resolved web page. For instance, the resolved web page may include a <link/> tag, and the extractor component 114 can extract information from a web page identified by such tag. In another example, the extractor component 114 can extract portions of the resolved web page that are included in an IFRAME. Types of data extracted by the extractor component 114 (as defined in an extractor definition utilized to extract the content) may be or include a title corresponding to the resolved web page, a description corresponding to the resolved web page, a thumbnail image that is descriptive of content of the web page, a URL to a video displayed on the web page, amongst other data.

A packager component 116 can package data extracted by the extractor component 114 into a structured data object. A computer executable application can receive the structured data object and perform one or more computer-executable tasks using the structured data object. In an example, a display component 118 can receive a structured data object and can cause a rich summary preview of the web page to be rendered on the display screen of a computing device based at least in part upon content of the structured data object. For example, such rich preview may include a title of the web page, a short description of content of the web page, and a thumbnail image that is indicative of content of the web page. In another example, the structured data object may include a title, a description, and a link to a video file that is displayed on the web page. In such a case, the display component 118 can display in a rich preview form the video and the title to a recipient of the URI. Of course, other utilizations of the structured data object are contemplated and intended to fall under the scope of the hereto-appended claims. For example, a search engine may utilize the structured data object to categorize one or more web pages. In another example, structured data objects may be subject to a data mining task (e.g., a particular domain includes X number of structured data objects of a particular type).

In an example implementation of the system 100, a sender of a URI may copy and paste or place a URI into an email that is intended for a recipient. The resolver component 104 can generate a resolved web page, and the selector component can select one or more extractor definitions from the data store 108 based at least in part upon content of the web page and/or a domain corresponding to the web page. The extractor component 114 can extract entities from the resolved web pages as defined by the selected extractor definition, and the packager component 116 can create a structured data object that is representative of the web page corresponding to the URI placed in the email application by the sender of the URI. The display component 118 (e.g., in an email application) can receive the structured data object that is representative of the web page and can cause a rich preview summary of the web page to be displayed to the recipient of the email. Thus, the recipient of the email need not select the URI to cause the URI to open the web page in a browser, but can instead determine whether the web page is of interest by quickly reviewing the rich preview.

Referring now to FIG. 2, an example structured data object 200 that can be generated through utilization of the system 100 is illustrated. In this example, the structured data object includes data that indicates a type 202 of such object 200. For example, the type 202 may indicate that the structured object 200 represents a book. The structured data object 200 may also include a thumbnail 204 which may be an image extracted from the web page. Such image may be, for instance, a cover image of the book represented by the structured data object 200.

The structured data object 200 may also include a title 206 of the book represented by the structured data object 200, as well as an ISBN number 208 of such book. Furthermore, the structured data object 200 may include a description of the book, wherein the description 210 can be extracted from a portion of the web page that includes a short description. Additionally, the structured data object 200 can include a URL 212 that corresponds to the web page from where data was extracted to generate the structured data object 200. For example, if a rich preview of the web page is generated utilizing the structured data object 200, the URL 212 can be utilized to cause the structured data object to act as a hyperlink. Upon the individual selecting the rich preview, a browser can be caused to load the web page.

With reference now to FIG. 3, another example structured data object 300 is illustrated. In this case, the structured data object 300 can represent a video. The structured data object includes a type 302 which can indicate that the structured data object 300 represents a video. A title 304 can describe the title of the video, and a description 306 may include a description of the video (e.g., extracted from a web page). The structured data object 300 may also include a URL 308 to the video file itself and/or to the web page that displays the video file. (In some cases, a web page displaying a video is not the location of the video file.) The structured data object 300 may also include a format 310, which can indicate a format of the video. The format 310 can be utilized by the client application to load requisite data to play the video. The structured data objects 200 and 300 are but a few examples of the numerous types of structured data objects that can be generated through utilization of the system 100. Since the data in such objects 200 and 300 is structured in nature and is consistent, a client application can perform computer executable instructions on such structured objects 200 and/or 300.

Figure 4:
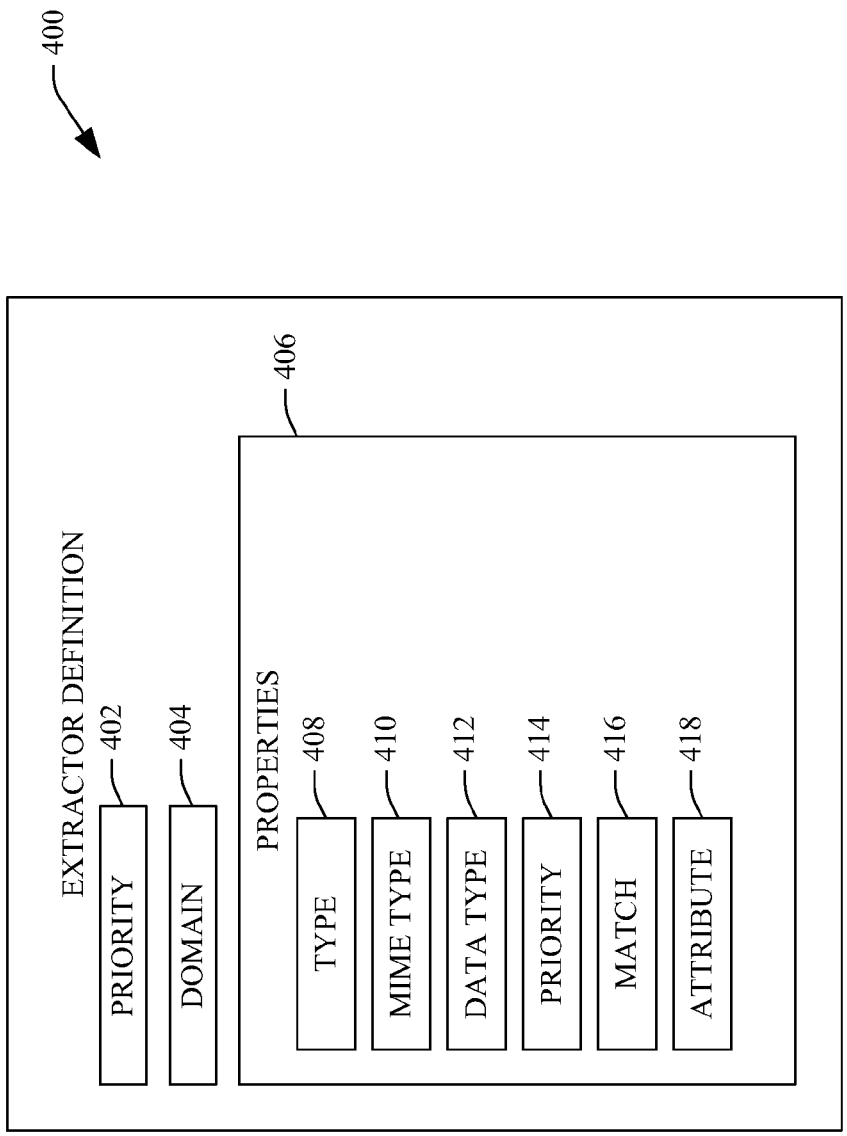
FIG. 4 illustrates an example schema that can be used to construct an extractor definition.

Now referring to FIG. 4, an example schema 400 for utilization in constructing an extractor definition is presented. As indicated above, the schema 400 may be an XML schema. An extractor definition generated by way of the schema 400 can describe structured data in a generalized manner and further define how data should be extracted from web pages for each desirably extracted entity. In an example, an extractor definition constructed through utilization of the schema 400 may be embedded in an RSS or ATOM feed.

In an example, the schema 400 may include a priority element 402. The priority element 402 can be utilized to indicate a priority of an extractor definition in comparison with other extractor definitions for a certain web page or type of web page. For example, if the selector component 106 (FIG. 1) selects multiple extractor definitions, the extractor definition to utilize first can be based upon the priority element 402 in the extractor definition. For instance, the extractor definition may correspond to a particular domain. Thus, for such domain the priority (as defined in the priority element 402) may be higher than general purpose extractor definitions (which can be employed to extract entities from a resolved web page if the higher priority extractor definition is not able to extract the requisite information from the web page).

The schema 400 may also include a domain element 404. The domain element 404 can indicate that the extractor definition applies to a particular domain. Furthermore, the domain element 404 may have an attribute corresponding thereto that indicates that the extractor definition also applies (or does not apply) to sub-domains of the domain in the domain element 404. The domain element 404 may be optionally populated for a particular extractor definition. If the extractor definition does not include the domain element 404, the extractor definition may apply to any domain (the extractor definition may be general in nature).

The schema 400 may also include a properties element 406. The properties element 406 can include one or more child elements that can be used to describe retrievable entities from the resolved web page to be included in the structured data object created through utilization of the extractor definition. Child elements in the properties element 406 may include syntax to encode the method by which to extract the value of the entities in the resolved web page that correspond to the child elements. For example, a child element may correspond to extraction of a title from a web page.

In an example, each child element of the properties element 406 may include a type attribute 408. The type attribute 408 can include data that defines how an entity in a resolved web page that corresponds to the child property will be extracted from the resolved web page. For example, the type attribute 408 may indicate that one or more CSS selectors will be utilized in connection with extracting an entity from a web page. A CSS selector can define how to retrieve a particular element from an HTML document object model (DOM). CSS selectors that can be utilized/identified in the type attribute 408 can include type selectors (e.g., div, span, form); descendent selectors (e.g., the space character); child selectors (e.g., the ">" character); one or more attribute selectors including E [foo], which is the element E with attribute foo, and E [foo="bar"], which is the element E with attribute foo whose value is "bar". Additionally, the type attribute 408 can indicate that the CSS selector is an nth-child(n) pseudo-class, one or more ID selectors (e.g., div# login), and/or one or more class selectors (e.g., div.post).

In another example, the type attribute 408 can indicate that a formatter is to be employed when extracting an entity that corresponds to the child element. This indicates that the extractor component 114 is to utilize the value of an entity desirably extracted from the resolved web page as a format string. The format string can reference one or more other entities/properties of any type. For example, http://video- .com/v/[data:video_id].swf will extract the data:video_id using the extraction method of the child element and then insert the data:video_id into the string. Of course, other types of mechanisms for describing how the extractor component 114 is to be employed in connection with extracting data from a resolved page are contemplated by the inventors and intended to fall under the scope of the hereto-appended claims.

A child element of the properties element 406 may also include a MIME type attribute 410 that indicates the MIME type of the return value of an entity extracted from the resolved web page. For instance, the MIME type can be set as a default to text/plain.

A data type attribute 412 can indicate a type of data that is to be returned to generate a structured data object. This property can be utilized in connection with determining how to normalize extracted data. For instance, URLs extracted from an HTML page can be relative and, by specifying a URL data type, the extractor component 114 (FIG. 1) can attempt to resolve the relative URLs against a URL of a current page. Another example of data normalization is converting dates into a standard, sharable format. For instance, a website may list a date as "Wednesday, Apr. 4, 2009", and can be normalized to 2009-04-04. If the data type attribute 412 is empty, then the extractor component 114 may fail to perform any data normalization.

A priority attribute 414 can indicate a priority in extracting a certain entity from the resolved web page. For instance, if the extractor definition includes more than one data property (more than one child element) with a substantially similar name but different extraction methods, such properties can be prioritized. For example, the title of a page may be in the <title> element of the resolved web page or in a <meta type="title"/> element of the resolved web page. Where to search for such title can be prioritized using the priority attribute 414.

A match attribute 416 can define whether matching an entity in the resolved web page is required for the extractor component 114 to declare that it has detected a structured data object on a web page. The default value for the match attribute 416 may be false. For example, the match attribute 416 may be applicable only to CSS selector type properties.

Furthermore, the properties element 406 can include an attribute attribute 418. If the value of the property (the child element) is found in the attribute of an entity on the resolved web page, the attribute name can be specified in the attribute 418.

Furthermore, as described above, the extractor definition may be included in an ATOM or RSS feed. Thus, elements corresponding to ATOM or RSS may be utilized to embed the schema 400. For example, an ATOM id element can be used to assign a unique identifier to the extractor definition (e.g., a UU ID) that can be formatted as a URN. urn:uuid:<uuid>. Additionally, a category element can be supported that can be utilized to denote that a structured data object created through utilization of the extractor definition is a strongly typed structured data object. For example, a structured data object of type "book" might be expected to have a title, an author, and an ISDN number, which can help client applications perform computer-executable tasks on the information included in the structured data object. Additionally, the extractor definition may include a content element in an ATOM feed, for example, wherein the content element is the container for the schema 400. While the example schema 400 has been shown and described in a certain particular format, it is to be understood that extractor definitions may be generated in any suitable format that describes what content is to be extracted from HTML pages, and further describes a method for extracting such content in a uniform structured manner.

Shown below is an example extractor definition that corresponds to the schema 400. The example extractor definition is provided for purposes of illustration, and is not intended to limit the applicability of the schema 400.

```
<entry>
    <title> Web Page Video</title>
    <updated> 2009-12-11T21:20:00Z</updated>
    <id>urn:uuid:4ffb4c79-d990-40a3-a628-26976a7dc80a</id>
    <category ter="video"> </category>
    <content type="application/xml">
        <data:domain>video.com</data:domain>
        <data:properties>
            <data:title data:required="true" data:attr="content">
<![CDATA[meta[name="title"]]]> </data:title>
            <data:description data:required="true" data:attr="content">
<![CDATA[meta[name="description"]]]> </data:description>
            <data:videoID data:required="true" data:attr="value">
<![CDATA[form[name="addToFavesForm"]>input[name="video_id"]]]> <data:videoID>
            <data:thumbnail data:mimeType="image/jpeg"
data:type="formatter"><![CDATA[http://i.ytimg.com/vi/{data:videoId}/default.jpg]]>
<thumbnail>
            <data:videoURLdata:mimeType="application/x-shockwave-flash"
Data:type="formatter"> <![CDATA[http://www.domain.com/v/{data:videoId}]]>
</data:videoURL>
        </data:properties>
    </content>
</entry>
```

Figure 5:
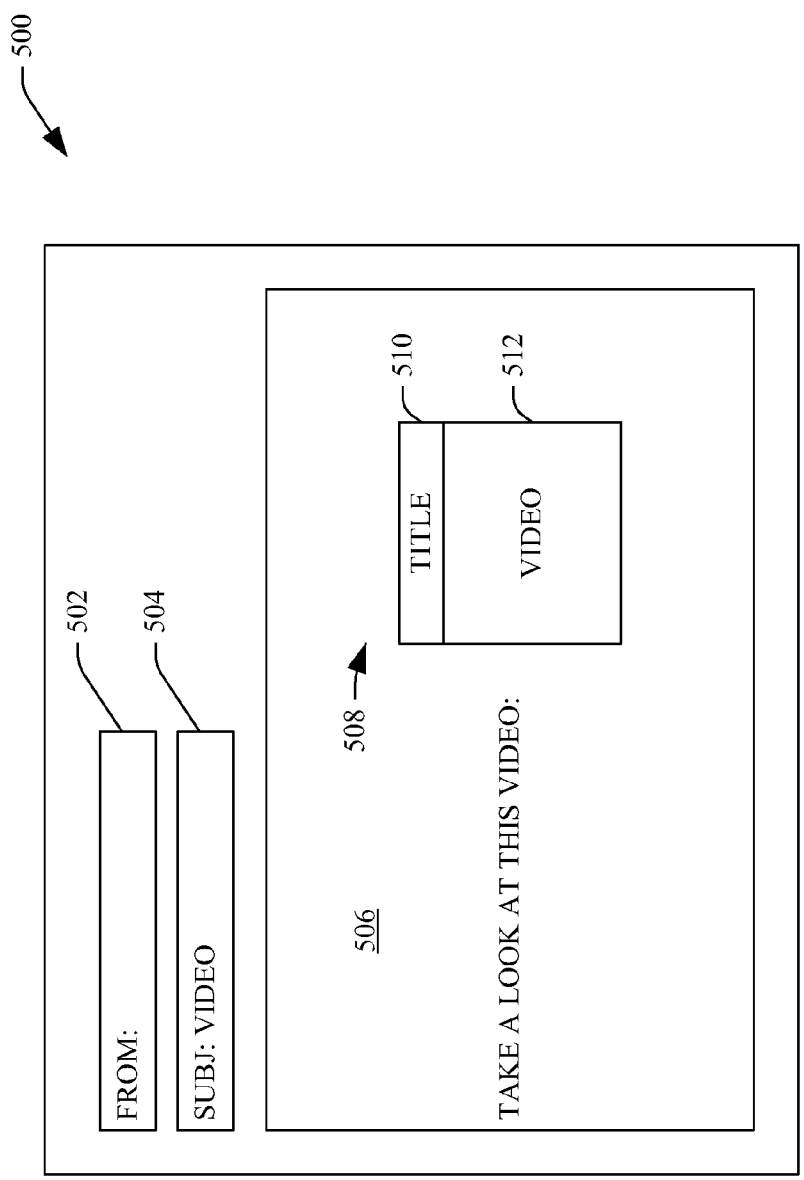
FIG. 5 is an example graphical user interface that depicts a rich preview of a web page in-line with content of an email.

Referring now to FIG. 5, an example graphical user interface 500 is illustrated. The graphical user interface 500 may correspond to an email application that is utilized to send and receive messages. The graphical user interface 500 may include a "from" field 502 that indicates a sender of the message and a "subject" field 504 that indicates a subject of the message. The graphical user interface 500 may also include a "content" field 506 that may include text and/or images. In this example, a sender of an email includes the URL that corresponds to a video in the email. The recipient, rather than receiving the URL, can receive a rich preview of the video that corresponds to the URL. Such rich preview can be generated by an application that receives a structured data object corresponding to the web page that pertains to the rich preview 508. In this example, the rich preview 508 can include a title 510 and a video 512. The client application can load requisite data to play the video 512 in the rich preview 508 to the recipient of the email. Thus, the recipient can watch a small version of the video 512, and if the video 512 is interesting to the recipient, the recipient can select the rich preview 508, which can cause the web browser to load the web page that corresponds to the rich preview 508. Therefore, the recipient is provided with some context pertaining to the web page that corresponds to the rich preview 508 without having to direct a browser to such web page and interrupt the recipient's task.

Figure 6:
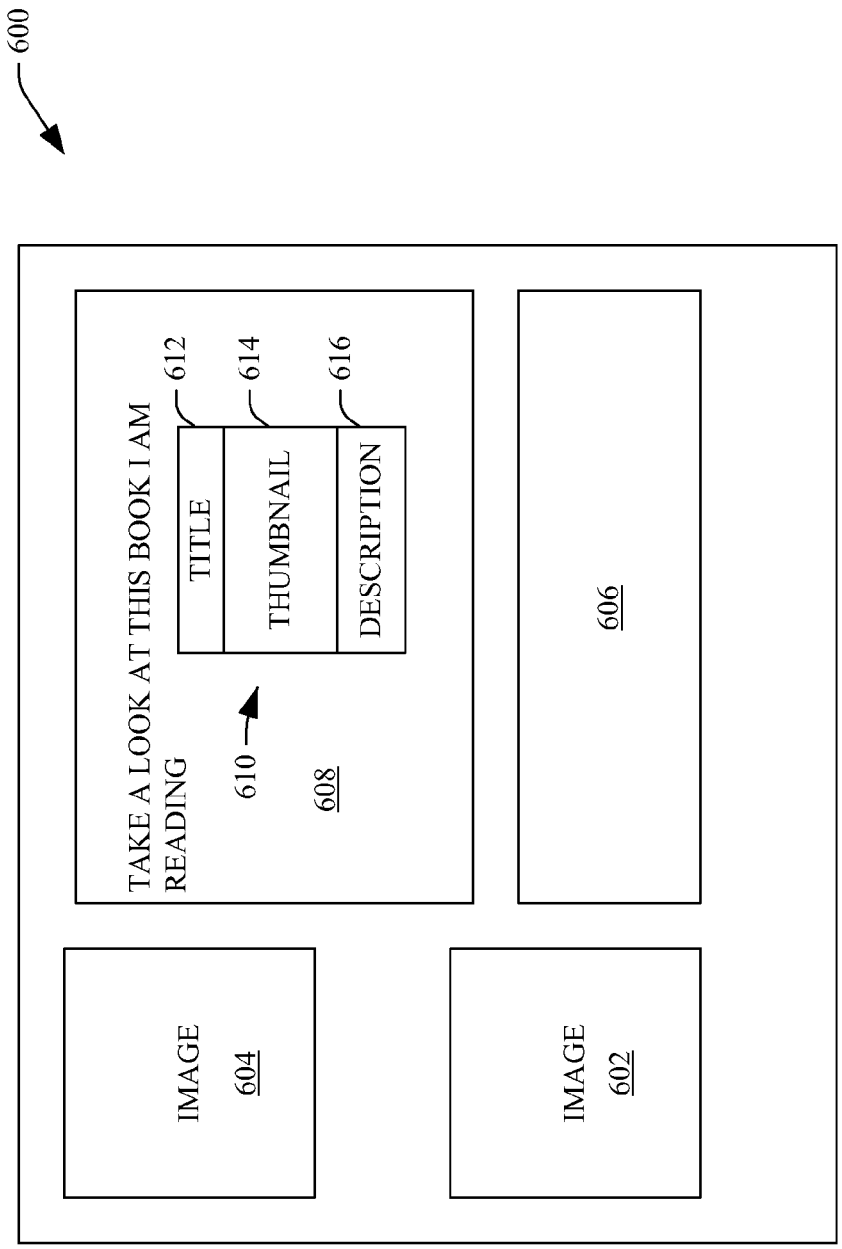
FIG. 6 is an example graphical user interface that depicts a rich preview of a web page displayed via an instant messaging application.

With reference now to FIG. 6, another example graphical user interface is illustrated. The graphical user interface 600 corresponds to an instant messaging application. The graphical user interface 600 may include an image 602 that identifies a first individual that is using the instant messaging application (e.g., a sender of data) and an image 604 that represents a second individual that is having an instant messaging conversation with the first individual (e.g., a recipient of data). The graphical user interface 600 also includes a data entry field 606, wherein the first individual can cause text to be sent to the second individual by entering data in the data entry field 606. A data display field 608 displays the conversation data between these two individuals.

In this example, the first individual transmits a URL corresponding to a web page that pertains to a particular book to the second individual via the instant messaging application. As described above, a structured data object can be generated through utilization of one or more extractor definitions, and the instant messaging application can cause a rich preview 610 of the web page to be simultaneously displayed to the first individual and the second individual in the field 608. If the rich preview pertains to a video, the first individual and the second individual can both simultaneously watch such video through utilization of the rich preview. For instance, the rich preview 610 includes a title 612, a thumbnail 614, and a description 616. It is to be understood that generation and display of the rich preview 610 can depend upon a client application that undertakes the rendering of such rich preview.

Figure 7:
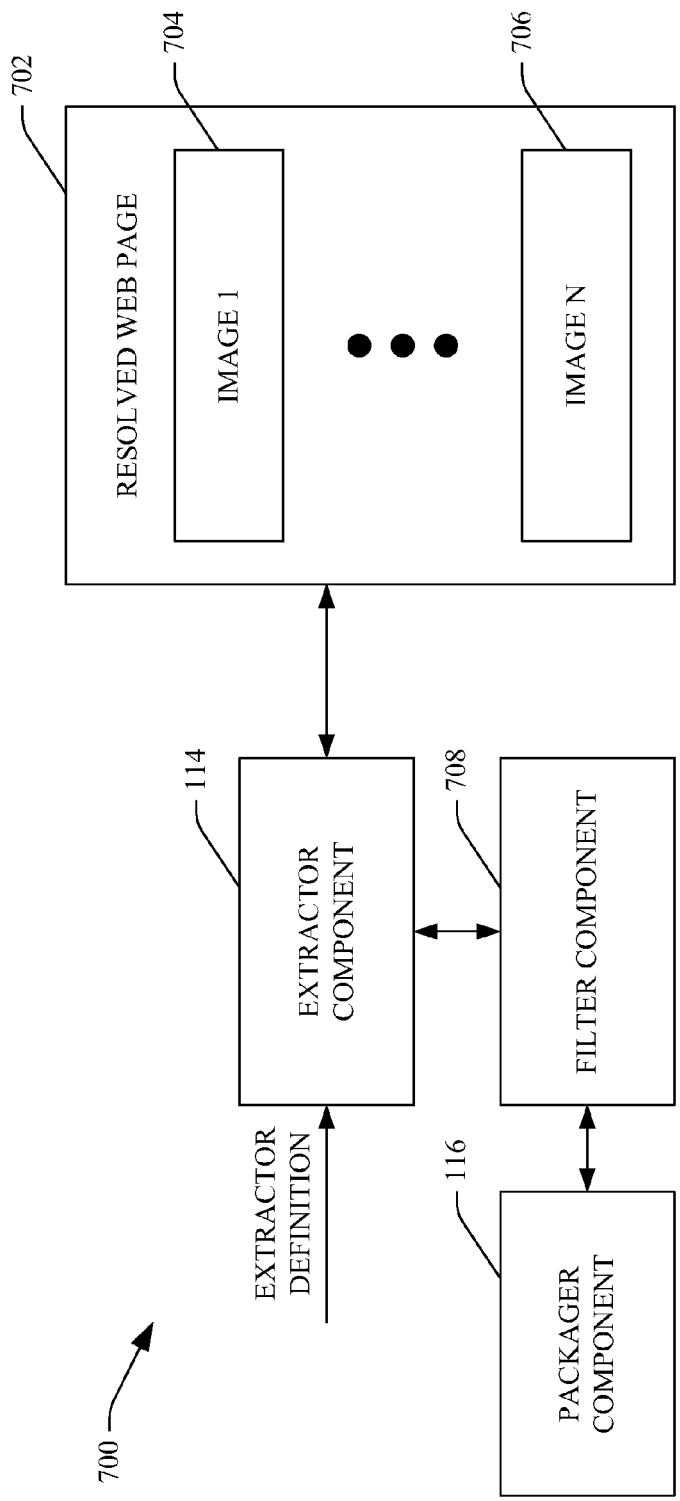
FIG. 7 is a functional block diagram of an example system that facilitates filtering out certain data extracted from a web page through use of an extractor definition.

Referring now to FIG. 7, an example system 700 that facilitates filtering data prior to the data being packaged in a structured data object is illustrated. The system 700 includes the extractor component 114 that receives the extractor definition and accesses a resolved web page 702 to extract data therefrom. As shown, the resolved web page 702 includes a plurality of images 704-706. The extractor component 114 can extract the plurality of images 704-706 based at least in part upon the extractor definition. That is, the extractor definition may include instructions for extracting each of the images 704-706. However, it may not be desirable to include all such images in the structured data object.

A filter component 708 can analyze the images extracted by the extractor component 114 and can filter a subset of such images based upon a predefined filtering criteria. For example, the filter component 708 can filter images that originate from an ad server. In another example, the filter component 708 may analyze height and width of such images 704-706 and filter out images that are below a certain height or width. In yet another example, the filter component 708 can analyze size of the images and filter images that are not the largest image from amongst the plurality of images 704-706.

Additionally or alternatively, the filter component 708 may perform some form of image analysis on the images 704-706, and may filter images based at least in part upon such image analysis. For instance, the filter component 708 may be configured to search for faces in the images, and may filter out images that do not include faces. It is to be understood that facial recognition is but one example of the many types of image analysis the filter component 708 may perform when filtering images. Further, the filter component 708 may filter types of data other than images. For example, the filter component 708 may act on video files, text, etc., through one or more filter rules. Data/entities not filtered by the filter component 708 may then be provided to the packager component 116, which can package such data in a structured data object.

Figure 8:
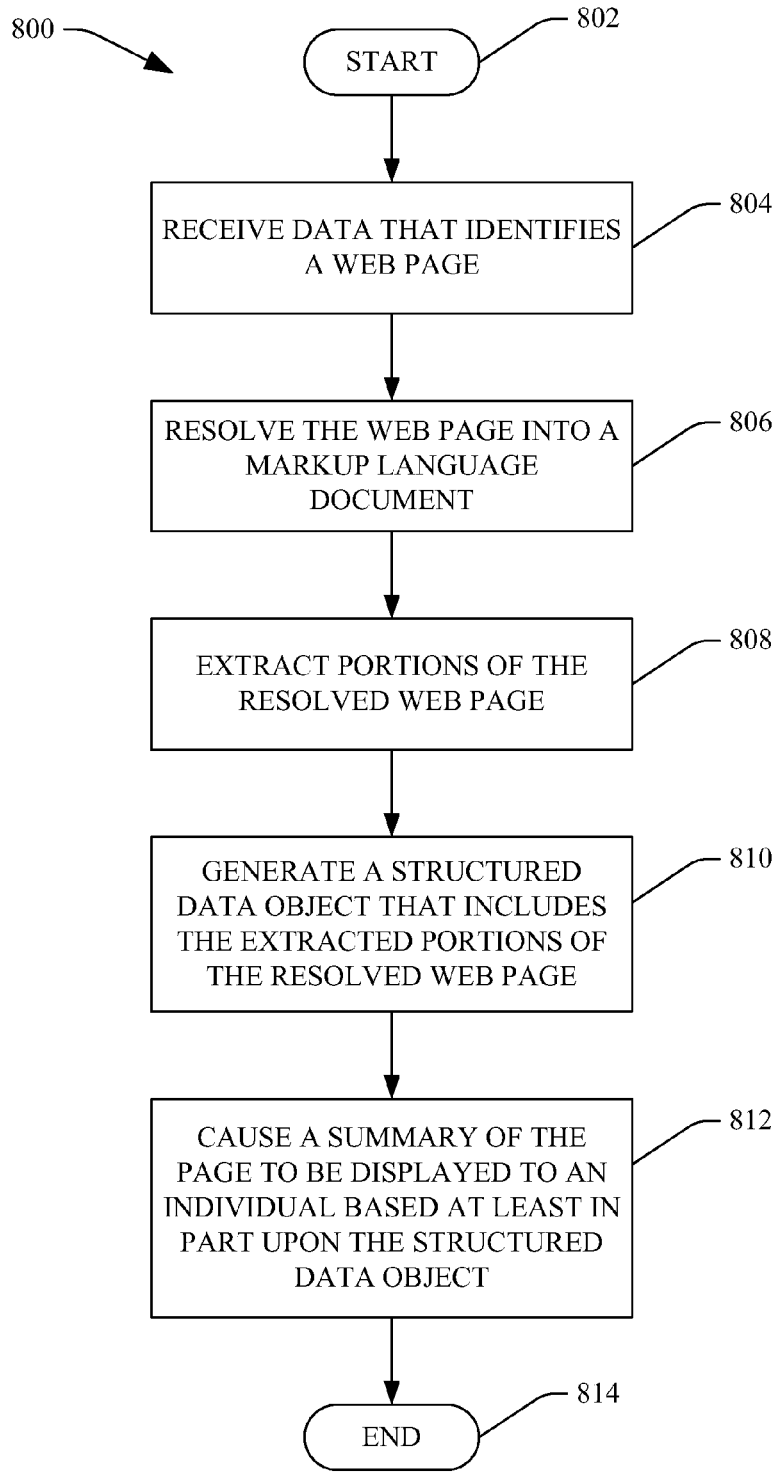
FIG. 8 is a flow diagram that illustrates an example methodology for generating a rich preview of a web page.
Figure 9:
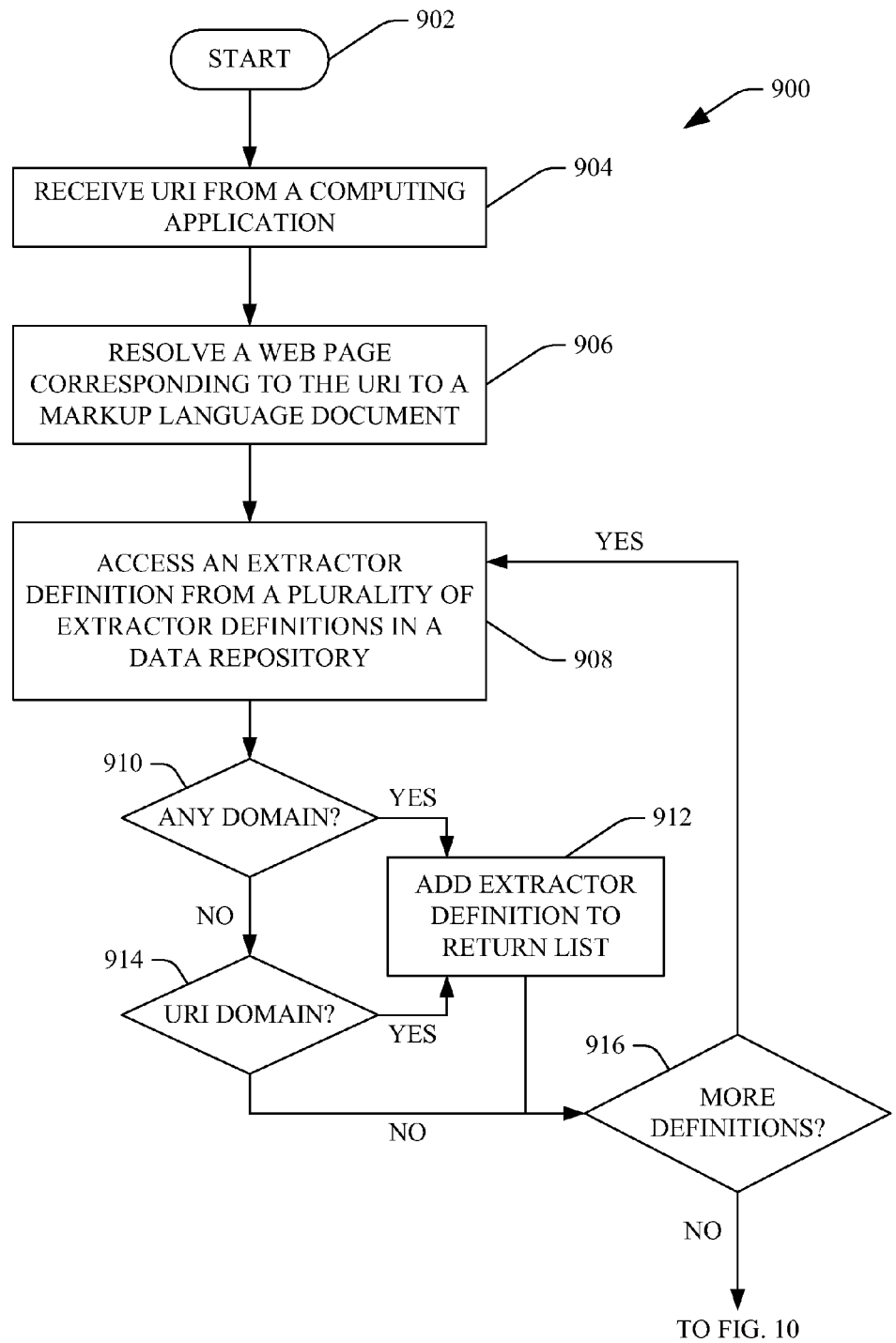
FIGS. 9 and 10 illustrate an example methodology for extracting data from a web page.
Figure 10:
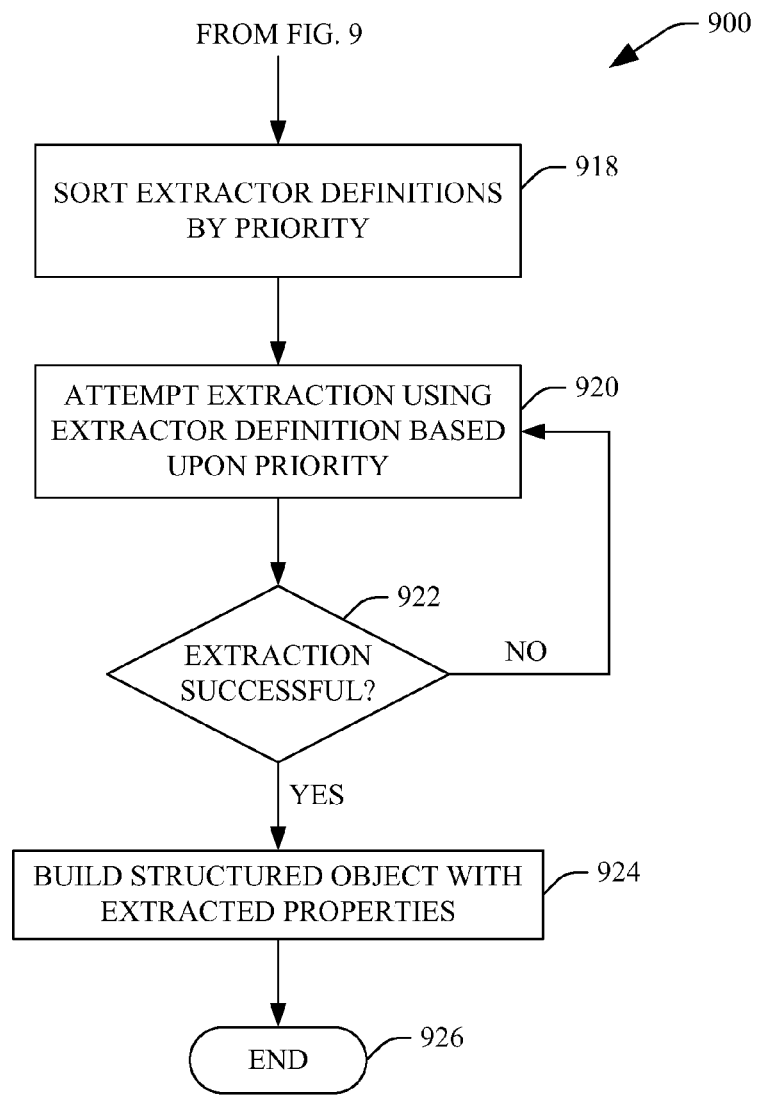

With reference now to FIGS. 8-10, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like.

Referring now to FIG. 8, a methodology 800 that facilitates causing a rich summary preview of a web page to be displayed to an individual is illustrated. The methodology 800 begins at 802, and at 804 data that identifies a web page is received. For example, the data that identifies the web page may a URI such as a URL. At 806, the web page is resolved into a markup language document. For example, the markup language may be HTML, XML or some other suitable markup language. At 808, portions of the resolved web page are extracted. As described above, the portions can be extracted at least in part upon contents of one or more selected extractor definitions. At 810, a structured data object that includes the portion of the resolved web page extracted from such web page is generated. At 812, a summary (rich preview) of the page is caused to be displayed to an individual based at least in part upon content of the structured data object. The methodology 800 completes at 814.

Now referring to FIG. 9, a methodology 900 that facilitates building a structured data object is illustrated. The methodology 900 starts at 902, and at 904 a URI is received from a computing application. For example, the application may be a client-side email application, a browser that is loading a server-side email application, an instant messaging application, etc.

At 906, a web page corresponding to the URI is resolved to generate a resolved web page, such that the web page is resolved to a markup language document. At 908, an extractor definition is accessed from a plurality of extractor definitions retained in a data repository. At 910, a determination is made regarding whether the accessed extractor definition applies to any domain. If the accessed extractor definition applies to any domain, then the methodology 900 proceeds to 912, where the extractor definition is added to a return list. If at 910 it is determined that the extractor definition applies only to a particular domain, then at 914 a determination is made regarding whether the domain of the URI corresponds to the extractor definition. If the domain of the URI corresponds to the extractor definition, then the methodology 900 proceeds to 912, where the extractor definition is added to the return list. Subsequent to the extractor definition being added to the return list, or after a determination is made that the URI domain does not correspond to the extractor definition, the methodology 900 proceeds to 916, where a determination is made regarding whether there are any additional extractor definitions that have not been analyzed. If there are more extractor definitions to be analyzed, then the methodology returns to 908. If there are no further extractor definitions, then the methodology proceeds to FIG. 10.

Now referring to FIG. 10, the methodology 900 is shown to continue. At 918, the extractor definitions in the return list are sorted based at least in part on priorities assigned to the extractor definitions. At 920, an attempt is made to extract one or more entities from the resolved web page using an extractor definition that was selected based at least in part upon priority data assigned thereto. For example, a first extractor definition in the return list with a higher priority than a second extractor definition will be utilized in an attempt to extract one or more entities from the resolved web page prior to the second extractor definition being utilized to extract one or more entities from the web page. At 922, a determination is made regarding whether an extraction has successfully occurred using a particular extractor definition. If an extraction is not successful, then the methodology returns to act 920, where another extractor definition is selected based at least in part upon priority data assigned thereto. If at 922 a determination is made that the extraction was successful, then at 924 a structured data object is built with entities extracted from the resolved web page. The methodology 900 completes at 926.

Figure 11:
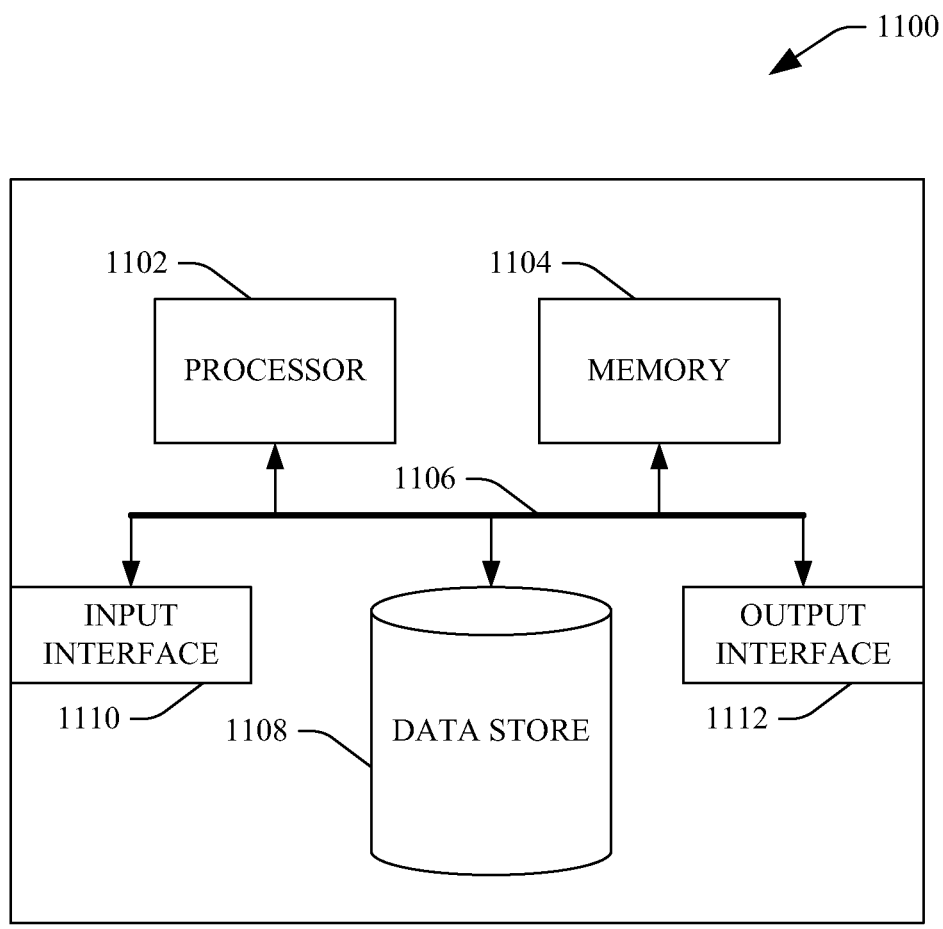
FIG. 11 is an example computing system.

Now referring to FIG. 11 a high-level illustration of an example computing device 1100 that can be used in accordance with the systems and methodologies disclosed herein is illustrated. For instance, the computing device 1100 may be used in a system that supports generating structured data objects from web pages. In another example, at least a portion of the computing device 1100 may be used in a system that supports displaying rich previews of web pages based upon structured data objects extracted from web pages. The computing device 1100 includes at least one processor 1102 that executes instructions that are stored in a memory 1104. The instructions may be, for instance, instructions for implementing functionality described as being carried out by one or more components discussed above or instructions for implementing one or more of the methods described above. The processor 1102 may access the memory 1104 by way of a system bus 1106. In addition to storing executable instructions, the memory 1104 may also store a plurality of extractor definitions, resolved web pages, etc.

The computing device 1100 additionally includes a data store 1108 that is accessible by the processor 1102 by way of the system bus 1106. The data store 1108 may include executable instructions, extractor definitions, images, etc. The computing device 1100 also includes an input interface 1110 that allows external devices to communicate with the computing device 1100. For instance, the input interface 1110 may be used to receive instructions from an external computer device, from an individual, etc. The computing device 1100 also includes an output interface 1112 that interfaces the computing device 1100 with one or more external devices. For example, the computing device 1100 may display text, images, etc. by way of the output interface 1112.

Additionally, while illustrated as a single system, it is to be understood that the computing device 1100 may be a distributed system. Thus, for instance, several devices may be in communication by way of a network connection and may collectively perform tasks described as being performed by the computing device 1100.

As used herein, the terms "component" and "system" are intended to encompass hardware, software, or a combination of hardware and software. Thus, for example, a system or component may be a process, a process executing on a processor, or a processor. In another example, a system or component may be a portion of memory or a series of transistors. Additionally, a component or system may be localized on a single device or distributed across several devices.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving, at communications application executing on a first computing device of a first individual, a URL of a web page;
   acquiring a markup language document that corresponds to the web page, the markup language document comprises unstructured data;
   subsequent to acquiring the markup language document, selecting an extractor definition from amongst a plurality of extractor definitions, the extractor definition identifying at least one portion of the markup language document that is to be extracted therefrom, wherein the extractor definition is selected based at least in part upon a priority value assigned to the extractor definition and priority values assigned to other extractor definitions in the plurality of extractor definitions;
   extracting the at least one portion of the markup language document in accordance with the extractor definition;
   generating a structured data object based at least in part upon the extracting of the at least one portion of the markup language document, wherein the structured data object includes the at least one portion of the markup language document; and
   causing a summary of the web page to be displayed to the first individual in the communications application in place of the URL, wherein the summary of the web page is based at least in part upon the structured data object.

2. The method of claim 1, wherein the markup language document is an HTML document.

3. The method of claim 1, wherein the markup language document is an XML document.

4. The method of claim 1, wherein selecting the extractor definition comprises:
   comparing a domain name of the URL with domain names assigned to a plurality of extractor definitions;
   determining that the domain name of the URL matches a domain name assigned to the extractor definition; and
   selecting the extractor definition from the plurality of extractor definitions based at least in part upon the determining that the domain name of the URL matches the domain name assigned to the extractor definition.

5. The method of claim 1, wherein extracting portions of the markup language document comprises:
   selecting an entity from the markup language document from amongst a plurality of entities in the markup language document based at least in part upon a priority assigned to a property in the extractor definition that is configured to cause the entity to be extracted from the markup language document.

6. The method of claim 1, wherein the communications application is an email application, and wherein the summary of the web page is displayed in an email transmitted to the first individual.

7. The method of claim 1, wherein the communications application is an instant messaging application, and wherein the summary of the web page is displayed in an instant message transmitted to the first individual from a second individual.

8. The method of claim 1, wherein the communications application is a social networking application, and wherein the summary of the web page is displayed on a web page that corresponds to the social networking application.

9. The method of claim 1, wherein the portion of the markup language document extracted therefrom resides in an IFRAME identified in the markup language document.

10. The method of claim 1, further comprising:
    extracting a plurality of portions of the markup language document in accordance with the extractor definition; and
    subsequent to extracting the plurality of portions of the markup language document and prior to generating the structured data object, filtering a subset of the plurality of portions of the markup language document that were extracted based at least in part upon predefined filtering criteria.

11. The method of claim 1, wherein the plurality of extractor definitions comprises a first extractor that is applicable to web pages of any domain, and wherein the plurality of extractor definitions comprises a second extractor definition that is applicable to a domain of the URL.

12. A system including a computer processor and comprising the following computer-executable components:
    a receiver component that receives a uniform resource identifier that corresponds to a web page, the uniform resource identifier included in a message to be displayed by way of a communications application;
    a selector component that selects an extractor definition from a plurality of extractor definitions, wherein the extractor definition is configured to indicate one or more entities that are desirably extracted from the web page, wherein the extractor definition comprises a plurality of properties for extracting a particular entity, wherein the properties have priorities corresponding thereto, and wherein the extractor component extracts the particular entity based at least in part upon the priorities corresponding to the properties;
    an extractor component that extracts the one or more entities from the web page as indicated in the extractor definition;
    a packager component that packages the one or more entities extracted from the web page in a structured data object; and
    a display component that displays a summary of the web page based at least in part upon the structured data object, the display component displaying the summary of the web page in the message in place of the uniform resource identifier.

13. The system of claim 12, wherein the extractor definition comprises instructions for extracting the one or more entities from the web page utilizing a web standard.

14. The system of claim 13, wherein the web standard is a CSS selector.

15. The system of claim 12, wherein the selector component selects the extractor definition from the plurality of extractor definitions based at least in part upon priority data assigned to the extractor definition.

16. The system of claim 12, further comprising a filter component that filters at least some unstructured data that has been extracted from the web page through utilization of the extractor definition based at least in part upon predefined filtering criteria.

17. The system of claim 12, wherein the communications application is one of an email application, an instant messaging application, or a social networking application.

18. The system of claim 12, wherein the plurality of extractor definitions comprises a first extractor that is applicable to web pages of any domain, and wherein the plurality of extractor definitions comprises a second extractor definition that is applicable to a domain of the uniform resource identifier.

19. A non-transitory computer-readable storage medium comprising instructions that, when executed by a processor, cause the processor to perform acts comprising:
    receiving a uniform resource identifier from a client-side computing application, wherein the uniform resource identifier corresponds to a web page, wherein the uniform resource identifier is included as a portion of a message received by way of a communications application;
    acquiring a markup language document for the web page;
    accessing a data repository that comprises a plurality of extractor definitions;
    compiling a return list of extractor definitions, wherein the return list of extractor definitions comprises at least one extractor definition that is applicable to web pages of any domain, and wherein the return list of extractor definitions comprises at least one extractor definition that is applicable to a domain of the uniform resource identifier;
    sorting extractor definitions in the return list based at least in part upon respective priorities assigned to the extractor definitions in the return list;
    extracting at least one entity from the markup language document through utilization of an extractor definition in the return list with a highest priority assigned thereto from amongst priorities assigned to other extractor definitions in the return list;
    generating a structured data object that includes the at least one entity;
    generating a summary of the web page based at least in part upon the structured data object; and
    displaying the summary of the web page in place of the uniform resource identifier in the message.

20. The computer-readable medium of claim 19, wherein the summary of the web page acts as a hyperlink to the web page.

* * * * *